2,811,557

PROCESS FOR THE MANUFACTURE OF ALKANOLAMINES

Archibald Robert Graham, Epsom, and Alfred Frank Millidge, Coulsdon, England, assignors to The Distillers Company Limited, Edinburgh, Scotland, a British company No Drawing. Application February 13, 1956, Serial No. 564,855

Claims priority, application Great Britain December 20, 1955

4 Claims. (Cl. 260—584)

The present invention relates to the production of mono- and di-alkanolamines which are substantially pure and free from tri-alkanolamines, from an olefine oxide by reacting the same with ammonia.

It is known that when olefine oxides such as ethylene oxide, propylene oxide or isobutene oxide, are reacted with ammonia so as to give the corresponding alkanolamines, a reaction mixture is obtained which contains the mono-, di- and tri-alkanolamines. Since the epoxide entering into the ammonia molecule is generally the most valuable component of the reatcion mixture, it is the aim of the art, especially when the tri-alkanolamine has no superior properties, to produce mono- and di-alkanolamines rather than the tri-alkanolamine which consumes, for instance, three times as much as much of the epoxy compound as the mono-alkanolamine. A number of processes have been proposed to reduce the formation of the tri-alkanolamines when these compounds are not desired, for example, by reducing the reaction temperature or using a large excess of ammonia (see B. P. 448,373, B. P. 497,093 and U. S. P. 2,196,554). The methods described in these Specifications require either a long time or involve complicated plant, high steam costs to recover the alkanolamines from dilute solutions or losses of ammonia or a combination of two or more of these factors.

It is an object of the present invention to provide a process for the production of a mono-alkanolamine from the corresponding olefine oxide without the formation of tri-alkanolamine, thus saving valuable olefine oxide which would require three moles of the alkanol for each mole produced. It is another object of the invention to improve the yield of mono-alkanolamine in preference to that of the di-alkanolamine. It is an additional object to produce a mono-alkanolamine in good yields from which emulsifying agents can be produced which are superior to those prepared from tri-ethanolamine, which latter are emulsifying agents wellknown and established in commerce.

The present invention is based on the discovery that by selecting 2,3-epoxy-n-butane for conversion into butanolamines and reacting the same with ammonia at elevated temperatures only mono-butanolamine and di-butanolamine are produced and that these alkanolamines may be produced with a relatively small excess of ammonia, thus saving the expense for the recovery of larger amounts of ammonia. No tri-butanolamine results from the reaction so far as we were able to ascertain even if we used very small amounts of ammonia and more drastic conditions than are usually required for, or will lead to, the production of other tri-alkanolamines.

The present invention therefore comprises reacting 2:3-epoxy-n-butane substantially free from 1:2-epoxybutane or 1:2-epoxy-2-methylpropane or other 1:2-epoxy compounds with ammonia in a proportion of more than 2.5 moles and less than 10 moles ammonia to each one mole of the epoxide under conditions for the production of alkanolamines whereby preponderating amounts of mono-butanolamine besides minor amounts of di-butanolamine but substantially no tri-butanolamine are produced. It is preferred to work at elevated temperatures, for example, at 70–180° C., advantageously at 90–120° C. Solvents may be used in the operation and as such, water and/or lower aliphatic alcohols, for instance, methanol, ethanol or propanol or ethers and cyclic-ethers such as dioxan, may be employed. The preferred solvent is water.

Although it was to be expected that a large molar excess of ammonia would furnish mono-butanolamine in preference to di-butanolamine, it is preferred for economic reasons to use not more than 5 moles to each mole of the epoxide since thereby less unreacted ammonia has to be recovered whereby, also, losses of ammonia are reduced.

The following table shows how the production of mono-butanolamine in relation to the amount of di-butanolamine is affected by varying the proportion of ammonia. It may be noted in this connection that even with as little as 0.34 mole of ammonia, no tri-butanolamine was produced whilst all the ammonia consumed was converted into di-butanolamine and the remaining epoxide was largely recovered unchanged.

| Moles NH$_3$/mole epoxide | Percent yield of butanolamines of theory | | |
|---|---|---|---|
| | Mono- | Di- | Tri- |
| 0.34 | Nil | 67 | Nil |
| 0.55 | 4.5 | 84.5 | Nil |
| 1.0 | 33.5 | 56 | Nil |
| 1.25 | 40 | 46 | Nil |
| 2.5 | 61 | 26 | Nil |
| 5.0 | 77 | 18 | Nil |
| 10.0 | 84 | 7.5 | Nil |

The yields as set out were calculated on the assumption that the epoxybutane used was 100% pure, but it was found to contain about 5% methylethylketone as impurity.

It has also been found that under the conditions used for the preparation of these butanolamines according to this invention, the usual formation of high boilers such as alkanolamine ethers, does not occur.

When industrial mixtures of n-butene isomers are converted into epoxides either by reaction with peroxy compounds or by the chlorhydrin method, mixtures of epoxides are obtained which contain considerable amounts of 1:2-epoxybutane. The presence of this 1:2-epoxybutane leads not only to the formation of tri-1:2-butanolamine when reacted with ammonia, but, as has been found, also results in the production of mixed tri-butanolamines, for example by the interaction of the 1:2-epoxybutane with di-2:3-butanolamine. Thus, when 6.7 grams of di-2:3-butanolamine and 3 grams 1:2-epoxybutane were heated in the presence of water in a sealed tube for 4 hours at 120° C., a viscouse product was recovered in considerable quantity on distillation, which had a boiling point 195–197° C./12 mm. Hg, $n_D^{20}$ 1.474 and which was found to be a mixed tri-butanolamine. In a comparative experiment, in which similarly a mixture of 10 grams of di-2:3-butanolamine, 6 grams of trans-2:3-epoxybutane and 15 cc. water was heated in a sealed tube at 120° C. for 4 hours, unchanged di-2:3-butanolamine was recovered on distillation of the reaction product and no high boiling residue remained.

The same experiment was executed under more drastic temperature conditions. 80.5 grams of di-2:3-butanolamine (0.5 mole), 42 grams of trans-2:3-epoxybutane (86% pure 0.5 mole) and 150 cc. of water were heated together in a stainless steel reactor at 160 to 170° C. for 5½ hours. 79 grams of unchanged di-2:3-butanolamine (0.49 mole=98%) was recovered by distillation of the reaction product. 43 grams of 2:3-butylene glycol (0.475 mole=95%) was also formed by hydrolysis of the trans-2:3-epoxybutane. No tri-butanolamine was observed. By the reaction of 1:2-epoxybutane with di-2:3-butanolamine and the formation thereby of a mixed tri-butanolamine an appreciable reduction in the yield of the desired mono- and di-butanolamines takes place. By reducing the butene-1 content in industrial mixtures of normal butenes before converting the latter into the epoxides, and subsequently reacting the epoxides thus obtained with ammonia, the yields of mono- and/or di-butanolamines obtainable from said industrial mixtures are considerably increased.

The process according to the invention may be carried out batchwise or in a continuous manner.

The butanolamines produced by the process of the invention are valuable materials for the preparation of emulsifiers, dispersing agents and detergents when condensed with higher fatty acids, such as stearic or oleic acids (in accordance with U. S. specification 2,302,697 and 2,094,609) or in the form of their salts, for instance, with stearic acid. This applies in particular to the mono-2:3-butanolamine.

In Chem. Abst. 1936, vol. 30, page 6701, there is a reference to a publication in Syntet. Kautsch, 1936, No. 6, pages 8–16, according to which pseudobutylene oxide when treated with 5 moles of 25% aqueous ammonia at 38° C. for 100 hours furnished 41.5% of mono-butanolamine and 40.0% of di-butanolamine. When, on the other hand, 3 moles of pseudobutylene oxide were treated with 1 mole of 25% aqueous ammonia for 6 hours at 100° C., the result was the production of 65.9% di-butanolamine and 26.6% of tri-butanolamine. Since we have found that pure 2:3-epoxybutane does not form a tri-butanolamine and gives a much higher yield of mono-butanolamine relative to di-butanolamine when treated with five moles of ammonia, the explanation is that the pseudobutylene oxide used by the authors contained considerable quantities of another epoxide, probably 1:2-epoxybutane. This is borne out by an earlier paper in Syntet. Kautsch, 1934, 3, pages 6–12, in which the authors admitted that the pseudobutylene from which they prepared their pseudobutylene oxide contained besides 80–82% butene-2 (pseudobutylene), 10–12% of other substances including butene-1. Since at that time the methods used for the analyses of butene isomers were not at all reliable, the butene-2 content of the pseudobutylene may well have been even lower.

The following examples serve to illustrate how the process of the invention is carried out in practice. The parts mentioned are by weight when not otherwise indicated. The strength of the aqueous ammonia is given in percent by weight.

Example 1

Pure trans-2:3-epoxybutane, B. P. 53.5° C., was obtained by fractionation of mixed cis- and trans-2:3-epoxybutane. A mixture of 20 parts of this trans-2:3-epoxybutane and 50 parts of aqueous ammonia (32%) was heated at 120° C. for 4 hours in a closed container. By distillation of the product, mono-2:3-butanolamine and di-2:3-butanolamine were recovered, but no tri-butanolamine was observed. The molar ratio of ammonia to the expoxide was 3:1.

The mono-butanolamine crystallised on standing. After recrystallisation from benzene the mono-2:3-butanolamine (erythro-form) had M. P. 37° C.

Example 2

Cis-2:3-epoxybutane boiling point 58–60° C. was prepared from cis-butene-2 by way of threo-3-chlorobutan-2-ol. A mixture of 10 parts of this cis-2:3-epoxybutane and 40 parts by volume of aqueous ammonia (30%) were heated together in a closed container at 120° C. for 4 hours. On distillation of the reaction product a mixture of mono-2:3-butanolamine and di-2:3-butanolamine but no tri-butanolamine were recovered. The molar ratio of ammonia to the epoxide was 4.5:1. The mono-2:3-butanolamine after separation from the di-2:3-butanolamine was pure threo-3-amino-butan-2-ol with a boiling point of 64–70° C./10 mm. Hg.

Example 3

A mixed cis- and trans-2:3-epoxybutane containing about 15% of the former (as indicated by the infra-red absorption spectrum) but substantially free from 1:2-epoxybutane and of a total purity of 89% was prepared by oxidation of butene-2 as described in U. S. A. patent application No. 251,676, dated October 17, 1951. 144 parts of this epoxide and 640 parts by volume of aqueous ammonia (30.3%) were heated together in a stirred, stainless steel autoclave at 110° C. for 4 hours. By distillation of the product, 136.5 parts, i. e. 77% mono-butanolamine and 29 parts i. e. 18% di-butanolamine were obtained. No tri-butanolamine was formed. The molar ratio of ammonia to epoxide was 5:1.

Example 4

A vertical, mild steel, steam-jacketed column reactor, suitable for working at pressures above atmospheric, was provided with inlets at the base for the continuous introduction of 2:3-epoxybutane and aqueous ammonia. Baffles inside the column prevented back-mixing. The product, on leaving the top of the reactor, passed through a cooler to a mild steel pressure receiver.

Aqueous ammonia ($d=0.880$) and a mixed cis- and trans-2:3-epoxybutane containing about 15% of the cis-compound and of a total purity of 82.5%, but substantially free from 1:2-epoxybutane, were pumped into the base of the column whilst a pressure of 200 lbs. per sq. inch was maintained by means of nitrogen. The reactants were introduced at such rates that the molar proportions of ammonia to epoxide were 5.5:1 and such that the residence time of the mixture in the column was 36 minutes. The pressure in the column was maintained at the 200 lbs. per square inch by blowing off excessive gas if necessary, and the temperature between 93–102° C. The reaction product was withdrawn from the top of the column and collected. After a run lasting three hours, the collected product was distilled and yielded 71% of mono-butanolamine and 19% of di-butanolamine calculated on the amount of epoxide actually charged. No tri-butanolamine was found.

Example 5

Two further runs were made in the equipment described in Example 4. In the first, the epoxide was prepared by oxidation of butene-2 according to the process described in U. S. pat. appln. No. 251,676, dated October 17, 1951, now Patent No. 2,741,623, granted April 10, 1956, and was 85% pure. In the second run, the epoxide was prepared from 2:3-butylene glycol via 3-chlorobutan-2-ol and was 89% pure and free from 1:2-epoxybutane. The pressure was maintained at 200 lbs. per square inch and the ammonia fed in the form of aqueous solution of a density $d=0.88$–$0.90$. The proportion of ammonia to epoxide, the residence time and the temperature can be gathered from the following table:

| Moles NH₃ per mole epoxide | Residence Time, mins. | Column temperature, °C. | Percent yield of butanolamine of theory on the epoxide fed | | |
| --- | --- | --- | --- | --- | --- |
| | | | Mono- | Di- | Tri- |
| 5.3:1 | 17 | 93–115 | 74.5 | 19 | nil |
| 5.1:1 | 35 | 94–99 | 77 | 18.5 | nil |

The mono-2,3-butanolamine obtained was converted with stearic acid into the corresponding stearate and this was compared regarding its property as an emulsifying agent with triethanolamine stearate which is commonly used in practice. For this purpose, 3% (A) and 1% (B) of the stearates were added to an emulsion of 40 parts by weight of water and 60 parts by weight of white mineral oil (spec. grav. 0.862) and 60° F. The emulsions were allowed to stand for varying periods of time after which separation in percentages occurred as indicated in the table:

| Hours | 24 | 48 | 72 | 96 | 120 |
|---|---|---|---|---|---|
| A | | | | | |
| 3% mono-2,3-butanolamine stearate | 0 | 0 | 0 | 0 | 0 |
| 3% triethanolamine stearate | 0 | 60 | 60 | 60 | 60 |
| B | | | | | |
| 1% mono-2,3-butanolamine stearate | 0 | 0 | 8 | 8 | 8 |
| 1% triethanolamine stearate | 34 | 34 | 34 | 34 | 34 |

The stearate of monobutanolamine thus had emulsifying properties superior to those of triethanolamine stearate under these conditions.

This application is a continuation-in-part of application Serial No. 261,388, filed December 12, 1951.

We claim:
1. A process which comprises reacting 2:3-epoxybutane which is substantially free of 1:2-epoxybutane and other epoxy compounds with ammonia in the proportion of about 2.5 moles to 10 moles of ammonia to one mole of 2:3-epoxybutane at a temperature of about 70–180° C. for a period not exceeding about four hours to produce principally mono-butanolamine and dibutanolamine in proportions of at least two parts of mono-butanolamine to one part of di-butanolamine, with no tri-butanolamine.
2. Process according to claim 1 for the production of mono-2:3-butanolamine wherein the molar proportion of ammonia to the 2:3-epoxybutane is about 5:1.
3. Process according to claim 1 wherein the reaction is carried out in the presence of water.
4. Process according to claim 1 wherein the reaction is effected at a temperature between 90 and 120° C.

References Cited in the file of this patent

UNITED STATES PATENTS

| | | |
|---|---|---|
| 2,281,177 | Vanderbilt | Apr. 28, 1942 |
| 2,662,097 | Baldwin | Dec. 8, 1953 |

OTHER REFERENCES

Batalin et al.: Chem. Abstract (1936), vol. 30, p. 6701.